(12) United States Patent
Shiga et al.

(10) Patent No.: US 8,611,329 B2
(45) Date of Patent: Dec. 17, 2013

(54) MOBILE COMMUNICATION TERMINAL AND PROGRAM

(75) Inventors: Noritake Shiga, Osaka (JP); Shuji Kitano, Osaka (JP)

(73) Assignee: Kyocera Corporation, Kyoto-shi (JP)

( * ) Notice: Subject to any disclaimer, the term of this patent is extended or adjusted under 35 U.S.C. 154(b) by 951 days.

(21) Appl. No.: 12/293,262

(22) PCT Filed: Mar. 28, 2007

(86) PCT No.: PCT/JP2007/056607
§ 371 (c)(1),
(2), (4) Date: Feb. 20, 2009

(87) PCT Pub. No.: WO2007/114150
PCT Pub. Date: Oct. 11, 2007

(65) Prior Publication Data
US 2009/0180457 A1    Jul. 16, 2009

(30) Foreign Application Priority Data
Mar. 31, 2006   (JP) .................................. 2006-099324

(51) Int. Cl.
    *H04J 3/06*        (2006.01)
(52) U.S. Cl.
    USPC ............ 370/350; 370/442; 370/503; 455/464
(58) Field of Classification Search
    USPC .......... 370/342, 229, 350, 311, 314; 455/418, 455/425, 574
    See application file for complete search history.

(56) References Cited

U.S. PATENT DOCUMENTS

| 7,020,477 B2 * | 3/2006 | Cramby et al. ................ 455/458 |
| 7,158,806 B2 * | 1/2007 | Harris et al. .................. 455/519 |
| 7,308,245 B2 | 12/2007 | Kakimoto et al. |
| 7,769,155 B2 * | 8/2010 | Radziewicz et al. ..... 379/207.16 |
| 2005/0048960 A1 | 3/2005 | Yamauchi et al. |

(Continued)

FOREIGN PATENT DOCUMENTS

| EP | 0763957 | 3/1997 |
| JP | 9-83425 | 3/1997 |

(Continued)

OTHER PUBLICATIONS

Notification of Reasons for Refusal mailed Jan. 11, 2011, directed towards corresponding Japanese application No. 2006-099324; 7 pages.

(Continued)

*Primary Examiner* — Yemane Mesfin
*Assistant Examiner* — Henry Baron
(74) *Attorney, Agent, or Firm* — Duane Morris LLP

(57) ABSTRACT

On the mobile communication terminal 100 side, when the VOIP communication application stored in the storage unit 104 is activated in accordance with an instruction from the user (step S101), the application activation judging unit 107*a* judges that the VOIP communication application has been activated. Upon the judgment, the control unit 107 selects a cycle (for example, 1.152 seconds: code F10) that is shorter than 5.152 seconds, generates an EISP signal based on the selection, and transmits the generated EISP signal to the base station 200 via the transmission unit 102 (step S102). After this, upon receiving an ACK signal, the control unit 107 starts to activate the reception unit 103 at the cycle of 1.152 seconds to receive the report signal at the cycle of 1.152 seconds (step S105).

7 Claims, 13 Drawing Sheets

(56) References Cited

U.S. PATENT DOCUMENTS

| | | | |
|---|---|---|---|
| 2005/0191965 A1* | 9/2005 | Yu et al. | 455/67.16 |
| 2008/0293440 A1* | 11/2008 | Srinivas et al. | 455/458 |
| 2009/0163144 A1* | 6/2009 | Nakatsugawa | 455/67.13 |

FOREIGN PATENT DOCUMENTS

| | | |
|---|---|---|
| JP | 9-83427 | 3/1997 |
| JP | 10-135893 | 5/1998 |
| JP | 10-135894 | 5/1998 |
| JP | 2006-50510 | 2/2006 |
| WO | WO-2005/022780 | 3/2005 |

OTHER PUBLICATIONS

3rd Generation Partnership Project 2 "3GPP2." (Jul. 2005). "cdma2000 High Rate Packet Data Air Interface Specification," 3GPP2 C.S0024-A, Version 2.0, Table of Contents, p. 8-29 to 8-65, p. 8-71 to 8-80.

International Search Report mailed Jun. 19, 2007 directed towards international application No. PCT/JP2007/056607; 4 pages.

Japanese Notification of Reasons for Refusal mailed Apr. 12, 2011, directed to corresponding Japanese Application No. 2006-099324; 6 pages.

* cited by examiner

FIG. 3

| Code | Cycle (seconds) |
|---|---|
| F1 | 10.152 |
| F2 | 9.152 |
| F3 | 8.152 |
| F4 | 7.152 |
| F5 | 6.152 |
| F6 | 5.152 |
| F7 | 4.152 |
| F8 | 3.152 |
| F9 | 2.152 |
| F10 | 1.152 |

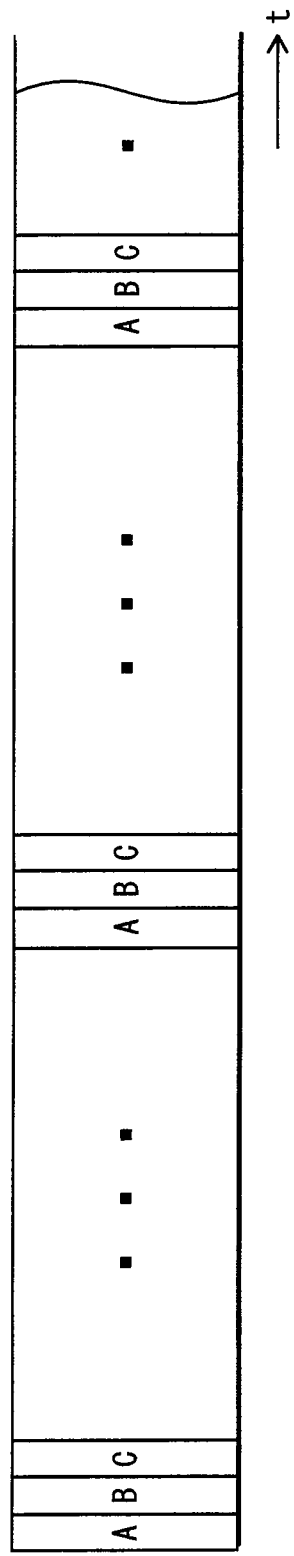
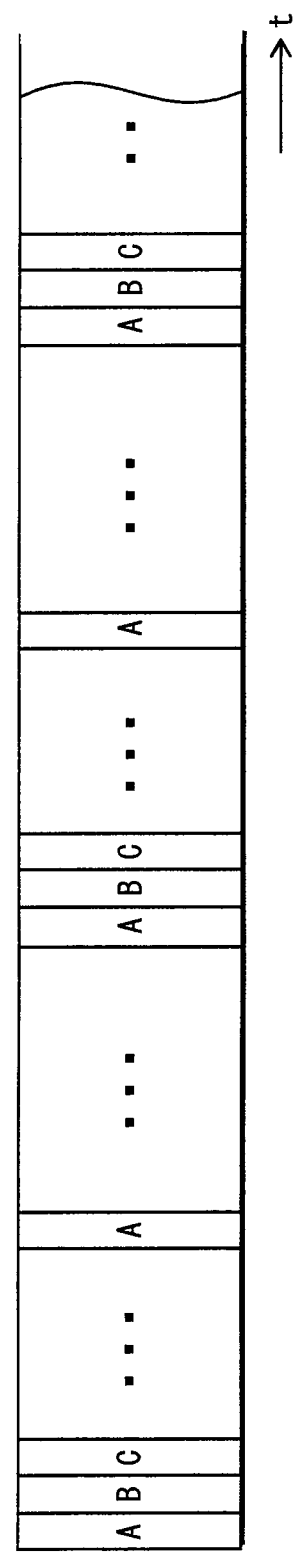
FIG. 4A
FIG. 4B

MOBILE COMMUNICATION TERMINAL AND PROGRAM

TECHNICAL FIELD

The present invention relates to a mobile communication terminal conforming to the CDMA2000 EVDO standard, and to a program for causing the mobile communication terminal to control communications.

BACKGROUND ART

The CDMA (Code Division Multiple Access) 2000 EVDO (Evolution Data Only) is one of conventional standards having been established to achieve high-speed data communications.

The high-speed communication performance of the standard is utilized in providing various services such as moving image distribution and the VOIP (Voice over Internet Protocol) communication (see Non-Patent Document 1).

Of these, the VOIP communication takes a form of audio communication where the encoded audio data, which is generated by encoding audio signals, is converted into a series of packets, and then transmitted via a server and a base station.

According to the CDMA2000 EVDO standard, a mobile communication terminal enters into a standby state when no communication is performed for a predetermined time period with the mobile communication terminal.

In the standby state, the mobile communication terminal activates a reception circuit for receiving a report signal at a predetermined cycle (approximately 5.152 seconds) such that it checks intermittently whether an incoming call destined thereto has been received by referring to the report signal, where the predetermined cycle is synchronized with the cycle at which the base station transmits the report signal.

As described above, in the standby state, the mobile communication terminal receives the report signal intermittently. This enables the mobile communication terminal to detect reception of an incoming call destined thereto, while at the same timesaving the battery of the terminal.

Non-Patent Document 1: "cdma2000 High Rate Packet Data Air Interface Specification", 3GPP2 C.50024, 3$^{rd}$ Generation Partnership Project 2, Oct. 27, 2000

DISCLOSURE OF THE INVENTION

The Problems the Invention is Going to Solve

However, the cycle, at which the mobile communication terminal receives a paging signal in the standby state, is as long as 5.152 seconds. This may cause a time lag between a time at which an incoming call is received, and a time at which the mobile communication terminal actually detects the reception of the incoming call.

Especially, when a mobile communication terminal enters the standby state while it is performing a communication that requires realtimeness, such as a VoIP communication, the terminal may detect reception of an incoming call with a delay of 5.152 seconds at the maximum. In such a state, a smooth communication with quick response cannot be achieved.

An object of the present invention is therefore to provide a mobile communication terminal that can save battery of the terminal itself and can improve the realtimeness in receiving an incoming call, during a CDMA2000 EVDO communication.

Means to Solve the Problems

According to one aspect of the present invention, for achieving the above object, there is provided a mobile communication terminal conforming to a CDMA2000 EVDO standard and having a function to check reception of an incoming call by receiving a report signal in synchronization with a cycle at which the report signal is transmitted from a base station, the mobile communication terminal comprising: a judging unit operable to judge a state of the terminal; a transmission unit operable to, in accordance with the state judged by the judging unit, transmit an EISP (Enhanced Idle State Protocol) signal that requests the base station to change the cycle of transmitting the report signal; and a reception unit operable to receive the report signal at another cycle resulted from the requested change.

The above-described mobile communication terminal may further comprise: a storage unit storing a predetermined application program for performing a communication, wherein the judging unit judges whether or not the predetermined application program has been activated, and when the judging unit judges that the predetermined application program has been activated, the transmission unit transmits an EISP signal that requests to shorten the cycle of transmitting the report signal.

The above-described mobile communication terminal may further comprise: a measuring unit operable to measure a remaining capacity of a battery of the terminal, wherein the judging unit judges whether or not the remaining capacity of the battery measured by the measuring unit is lower than a predetermined threshold value, and when the judging unit judges that the remaining capacity of the battery is not lower than the predetermined threshold value, the transmission unit transmits an EISP signal that requests to shorten the cycle of transmitting the report signal.

The above-described mobile communication terminal may further comprise: a time measuring unit operable to measure a time, wherein the judging unit judges whether or not the time measured by the time measuring unit is within a predetermined time period, and when the judging unit judges that the time measured by the time measuring unit is within the predetermined time period, the transmission unit transmits an EISP signal that requests to shorten the cycle of transmitting the report signal.

The above-described mobile communication terminal may further comprise: a communication unit operable to perform a communication in compliance with a standard that is different from the CDMA2000 EVDO standard; and a communication quality monitoring unit operable to monitor a communication quality of the communication unit, wherein the judging unit judges whether or not the communication quality monitored by the communication quality monitoring unit is lower than a predetermined threshold value, and when the judging unit judges that the communication quality monitored by the communication quality monitoring unit is lower than the predetermined threshold value, the transmission unit transmits an EISP signal that requests to shorten the cycle of transmitting the report signal.

The above-described mobile communication terminal may further comprise: an input unit operable to receive an input from a user, the judging unit judges whether or not the input unit has received, from the user, an input that requests to change the cycle, and when the judging unit judges that the input unit has received the input that requests to change the cycle, the transmission unit transmits an EISP signal that requests to shorten the cycle of transmitting the report signal.

According to another aspect of the present invention, for achieving the above object, there is provided a program for causing a mobile communication terminal to perform a communication control process, the mobile communication terminal conforming to a CDMA2000 EVDO standard and having a function to check reception of an incoming call by receiving a report signal in synchronization with a cycle at which the report signal is transmitted from a base station, the communication control process comprising the steps of: judging a state of the terminal; transmitting, in accordance with the state judged by the judging unit, an EISP (Enhanced Idle State Protocol) signal that requests the base station to change the cycle of transmitting the report signal; and receiving the report signal at another cycle resulted from the requested change.

Effects of the Invention

With the above-described structure, the mobile communication terminal of the present invention or the mobile communication terminal executing the program of the present invention can change the cycle at which the base station transmits the report signal, depending on the state of the mobile communication terminal itself, with use of EISP (Enhanced Idle State Protocol) defined in the CDMA2000 EVDO standard.

For example, when the mobile communication terminal enters the standby state while it is performing the VOIP communication requiring realtimeness, the mobile communication terminal can cause the base station to transmit the report signal at a cycle (for example, 1.152 seconds) that is shorter than the cycle of 5.152 seconds.

The above-described structure thus enables the mobile communication terminal to detect reception of an incoming signal at a shorter cycle when the terminal is in a state that requires the realtimeness.

On the other hand, when the mobile communication terminal is in a state that does not require the realtimeness, the terminal can save the battery by detecting reception of an incoming call at a longer cycle.

BRIEF DESCRIPTION OF THE DRAWING

FIG. 3 illustrates a data table from which a cycle is selected in accordance with the EISP.

FIGS. 4A and 4B illustrate time slots for the CDMA2000 EVDO standard.

Figure 1:
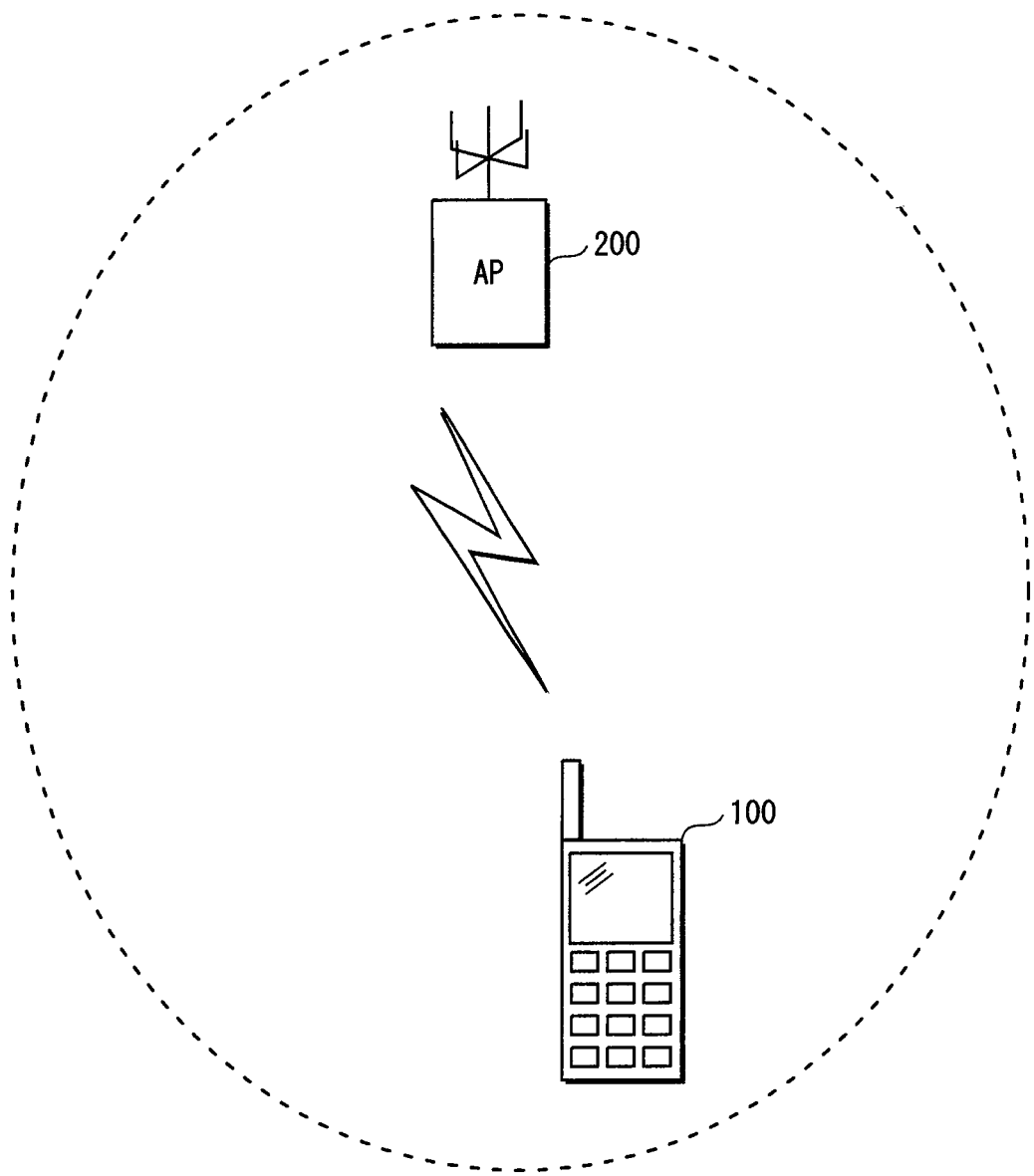
FIG. 1 illustrates a mobile communication system to which the mobile communication terminal 100 in Embodiment 1 belongs.

DESCRIPTION OF CHARACTERS 100 mobile communication terminal
101 antenna
102 transmission unit
103 reception unit
104 storage unit
105 display unit
106 input unit
107 control unit
107a application activation judging unit
107b remaining battery capacity judging unit
107c time judging unit
107d communication quality monitoring unit
107e input judging unit
108 time measuring unit
200 base station

BEST MODE FOR CARRYING OUT THE INVENTION

Embodiments of the present invention will be described in the following with reference to the attached drawings.

Embodiment 1

1. Overview

First, a CDMA2000 EVDO system to which a mobile communication terminal of Embodiment 1 belongs will be described with reference to FIG. 1.

As shown in FIG. 1, the CDMA2000 EVDO system includes a mobile communication terminal 100 and a base station 200.

The mobile communication terminal 100 performs communications with other mobile communication terminals (not illustrated) that belong to the base station 200, via the base station 200, and with mobile communication terminals that belong to other base stations.

The base station 200, in compliance with the CDMA2000 EVDO standard, performs relay processes such as transferring packet data from the mobile communication terminal 100 to other mobile communication terminals, and transferring packet data from other mobile communication terminals to the mobile communication terminal 100.

The base station 200 also has a function to transmit a report signal to each mobile communication terminal at a predetermined time interval, and has a function to change the predetermined time interval at which the report signal is transmitted, in accordance with the EISP (Enhanced Idle State Protocol).

The report signal includes information that indicates, for each mobile communication terminal, whether there has been an incoming call to a mobile communication terminal.

Each mobile communication terminal, when it is in the standby mode, confirms whether or not it has received an incoming call, by checking the received report signal.

2. Structure of Mobile Communication Terminal 100

The structure of the mobile communication terminal 100 will be described with reference to FIG. 2.

Figure 2:
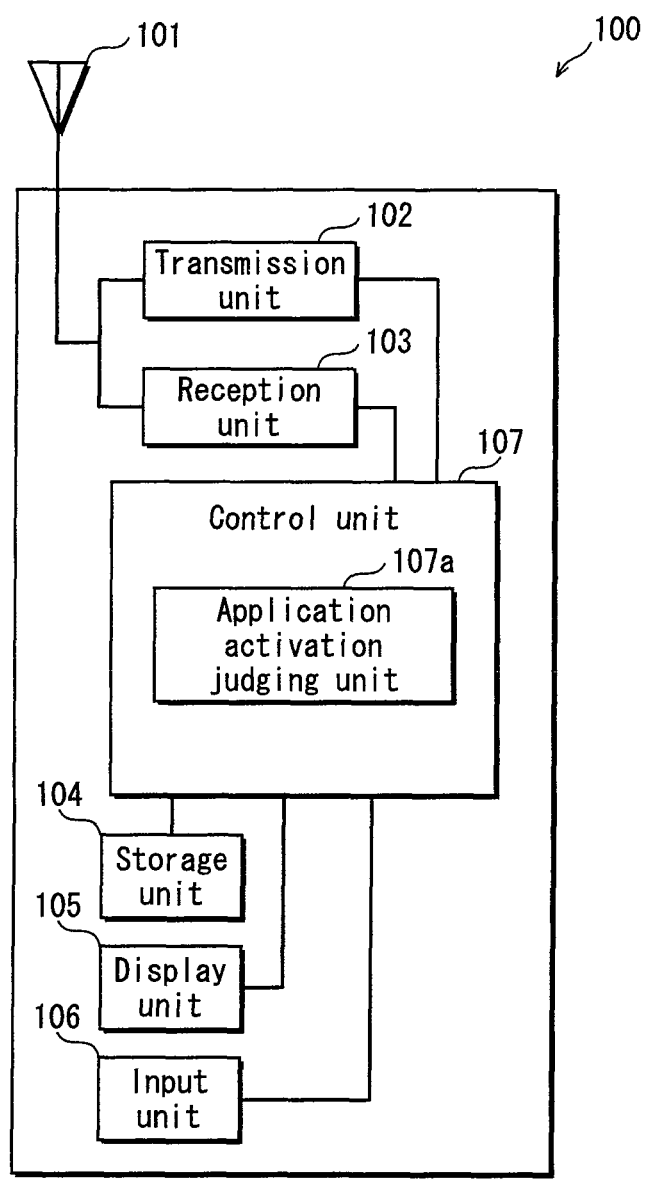
FIG. 2 is a block diagram showing the structure of the mobile communication terminal 100 in Embodiment 1.

With reference to FIG. 2, the mobile communication terminal 100 includes an antenna 101, a transmission unit 102, a reception unit 103, a storage unit 104, a display unit 105, an input unit 106, and a control unit 107.

The antenna 101 is an antenna for transmitting/receiving signals.

The transmission unit 102 sends, to the antenna 101, a signal which has been generated by modulating data to be transmitted in accordance with a protocol defined in the CDMA2000 EVDO standard.

For example, upon receiving an instruction from the control unit 107, the transmission unit 102 sends, to the antenna 101, a control signal (hereinafter referred to as "EISP signal") which is to be transmitted to the base station 200 in compliance with the EISP. The EISP will be explained later.

The reception unit 103 sends, to the control unit 107, data which has been generated by modulating a signal received via the antenna 101 in accordance with a protocol defined in the CDMA2000 EVDO standard.

Especially, when the mobile communication terminal is in the standby state, the reception unit 103 sends, to the control unit 107, data which has been generated by demodulating a report signal received from the base station 200.

The storage unit 104 is a memory for storing various information necessary for mobile communications.

Especially, the storage unit 104 stores a value of a predetermined cycle at which the reception unit 103 is activated to receive a report signal that is transmitted from the base station 200 in compliance with the EISP when the mobile communication terminal is in the standby state.

The storage unit 104 also stores a value of a predetermined cycle at which the reception unit 103 is activated in compliance with the EISP, and stores a VOIP communication application for executing a VoIP communication.

The display unit 105 is, for example, an LCD (Liquid Crystal Display) and displays various information in relation to mobile communications.

The input unit 106 is composed of a group of keys such as numerical keys and a cursor key and receives key inputs from the user.

For example, the input unit 106 receives, from the user, a key input that instructs to activate the VOIP communication application stored in the storage unit 104.

The control unit 107 is a CPU (Central Processing Unit) for controlling the elemental units 101 to 106 of the mobile communication terminal 100.

Especially, the control unit 107 includes an application activation judging unit 107a.

The application activation judging unit 107a judges whether or not the VoIP communication-application stored in the storage unit 104 has been activated.

3. EIPS

Next, the EIPS defined in the CDMA2000 EVDO standard will be explained with reference to FIGS. 3 to 4.

The EISP is a protocol that is able to change the cycle at which the base station 200 transmits the report signal, at the initiative of the mobile communication terminal 100.

As shown in FIG. 3, the storage unit 104 of the mobile communication terminal 100 stores information indicating a plurality of cycles (1.152 seconds to 10.152 seconds) and codes (F1 to F10) that are assigned to the cycles, respectively.

The mobile communication terminal 100 selects a desired cycle from the plurality of cycles (1.152 seconds to 10.152 seconds) and transmits a code corresponding to the selected cycle to the base station 200. With this operation, the mobile communication terminal 100 requests the base station 200 to transmit the report signal at the selected cycle. A signal that is transmitted to convey the request is called an EISP signal.

Upon receiving the EISP signal, the base station 200 starts to transmit the report signal at the requested cycle.

The base station 200 is initially set such that it transmits the report signal at a cycle of approximately 5.152 seconds (code F6).

As shown in FIGS. 4A and 4B, according to the CDMA2000 EVDO standard, a predetermined number of time slots are assigned to each of a plurality of mobile communication terminals so that the report signal is transmitted to each mobile communication terminal.

With this structure, it is possible to shorten the cycle at which the report signal is transmitted to a certain mobile communication terminal, by assigning an increased number of time slots to the certain mobile communication terminal.

For example, FIG. 4A shows that the report signal is transmitted to the mobile communication terminal 100 in time slots "A" among a plurality of time slots, and the report signal is transmitted at a cycle of 5.152 seconds.

On the other hand, FIG. 4B shows that an increased number of time slots "A" are assigned to the mobile communication terminal 100 compared with FIG. 4A, and thus the report signal is transmitted to the mobile communication terminal 100 at a shorter cycle than in FIG. 4A.

4. Operation

Next, the operation of the mobile communication terminal 100 in Embodiment 1 will be described with reference to FIG. 5.

It is presumed here that the mobile communication terminal 100 is in the standby state.

Figure 5:
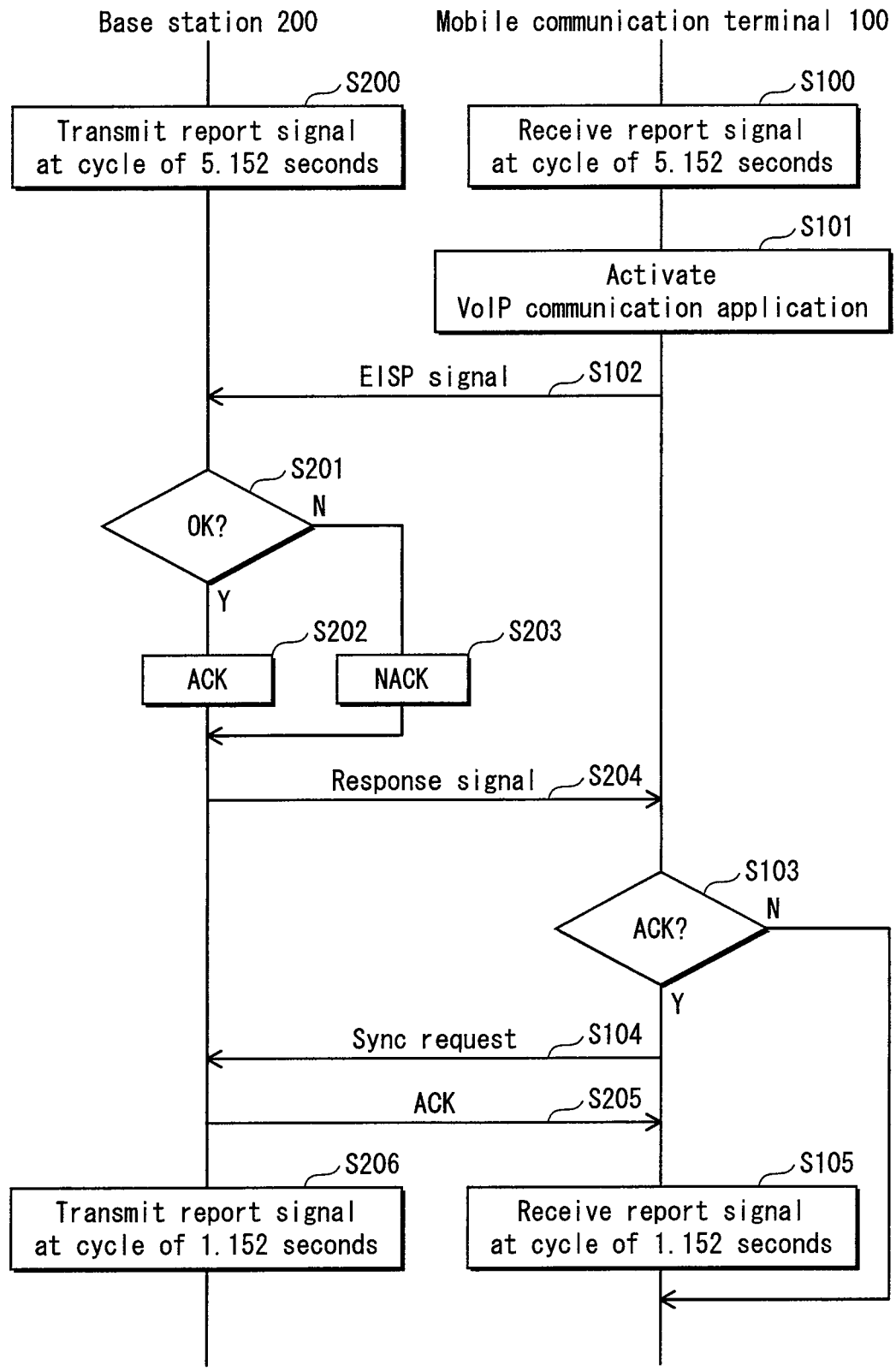
FIG. 5 is a flowchart showing the operation of the mobile communication terminal 100 in Embodiment 1.

As shown in FIG. 5, first, the base station 200 transmits the report signal to the mobile communication terminal 100 at the cycle of 5.152 seconds, which is an initial value (step S200).

On the mobile communication terminal 100 side, the control unit 107 activates the reception unit 103 at the cycle of 5.152 seconds so that it receives the report signal at the cycle of 5.152 seconds, in synchronization with the base station 200 (step S100).

After this, on the mobile communication terminal 100 side, the VOIP communication application stored in the storage unit 104 is activated in accordance with an instruction from the user or the like (step S101). The application activation judging unit 107a then judges that the VOIP communication application has been activated. Upon the judgment, the control unit 107 selects a cycle (for example, 1.152 seconds: code F10) that is shorter than 5.152 seconds, generates an EISP signal based on the selection, and transmits the generated EISP signal to the base station 200 via the transmission unit 102 (step S102).

Upon receiving the EISP signal, the base station 200 returns an ACK (ACKnowledge) signal to the mobile communication terminal 100 as a response signal when it permits to change the cycle (steps S202 and S204), and returns a NACK (Non-ACKnowledge) signal to the mobile communication terminal 100 as a response signal when it does not permit to change the cycle (steps S203 and S204).

When the ACK signal is returned, the mobile communication terminal 100 transmits a sync request signal for requesting the synchronization to the base station 200 (step S104).

In response to this, the base station 200 returns an ACK signal to the mobile communication terminal 100 (step S205), and starts to transmit the report signal at a cycle of 1.152 seconds (step S206).

On the mobile communication terminal 100 side, upon receiving the ACK signal, the control unit 107, after an elapse of a predetermined period of time, starts to activate the reception unit 103 at the cycle of 1.152 seconds (step S105).

With the above-described operation, when it is to perform a VOIP communication that requires the realtimeness, the mobile communication terminal 100 causes the base station 200 to transmit the report signal at a short cycle in accordance with the EISP.

This improves the response of the mobile communication terminal 100 to an incoming call because it receives the report signal with sufficient frequency.

Embodiment 2

1. Overview

In Embodiment 1, the mobile communication terminal 100 transmits the EISP signal by activating the VOIP communication application. In Embodiment 2, the mobile communication terminal 100 transmits the EISP signal depending on the remaining capacity of battery in the terminal.

2. Structure

The structure of the mobile communication terminal 100 in Embodiment 2 will be described with reference to FIG. 6.

The constituent elements common to Embodiments 1 and 2 are assigned with the same reference signs and description thereof is omitted here.

Figure 6:
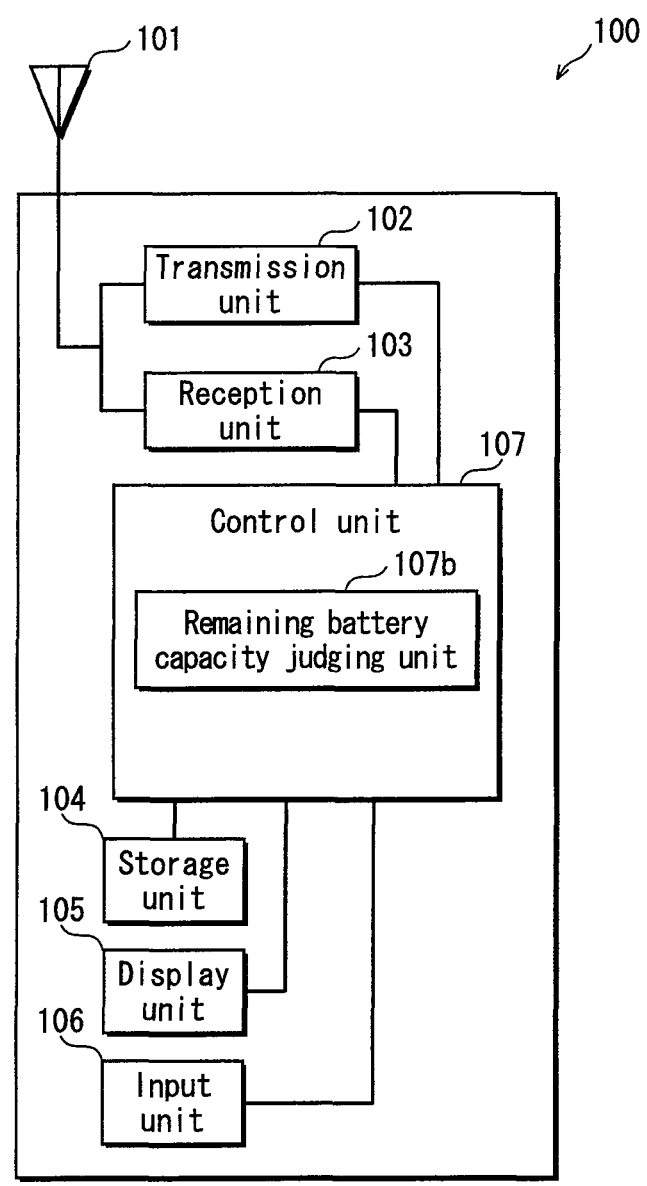
FIG. 6 is a block diagram showing the structure of the mobile communication terminal 100 in Embodiment 2.

With reference to FIG. 6, the control unit 107 includes a remaining battery capacity judging unit 107b.

The remaining battery capacity judging unit 107b measures the remaining capacity of the battery (not illustrated) in the terminal, and judges whether the measured value is not lower than a predetermined threshold value.

The storage unit 104 stores the predetermined threshold value for the remaining battery capacity.

3. Operation

Next, the operation of the mobile communication terminal 100 in Embodiment 2 will be described with reference to FIG. 7.

The operation steps common to Embodiments 1 and 2 are assigned with the same reference signs and description thereof is omitted here.

Figure 7:
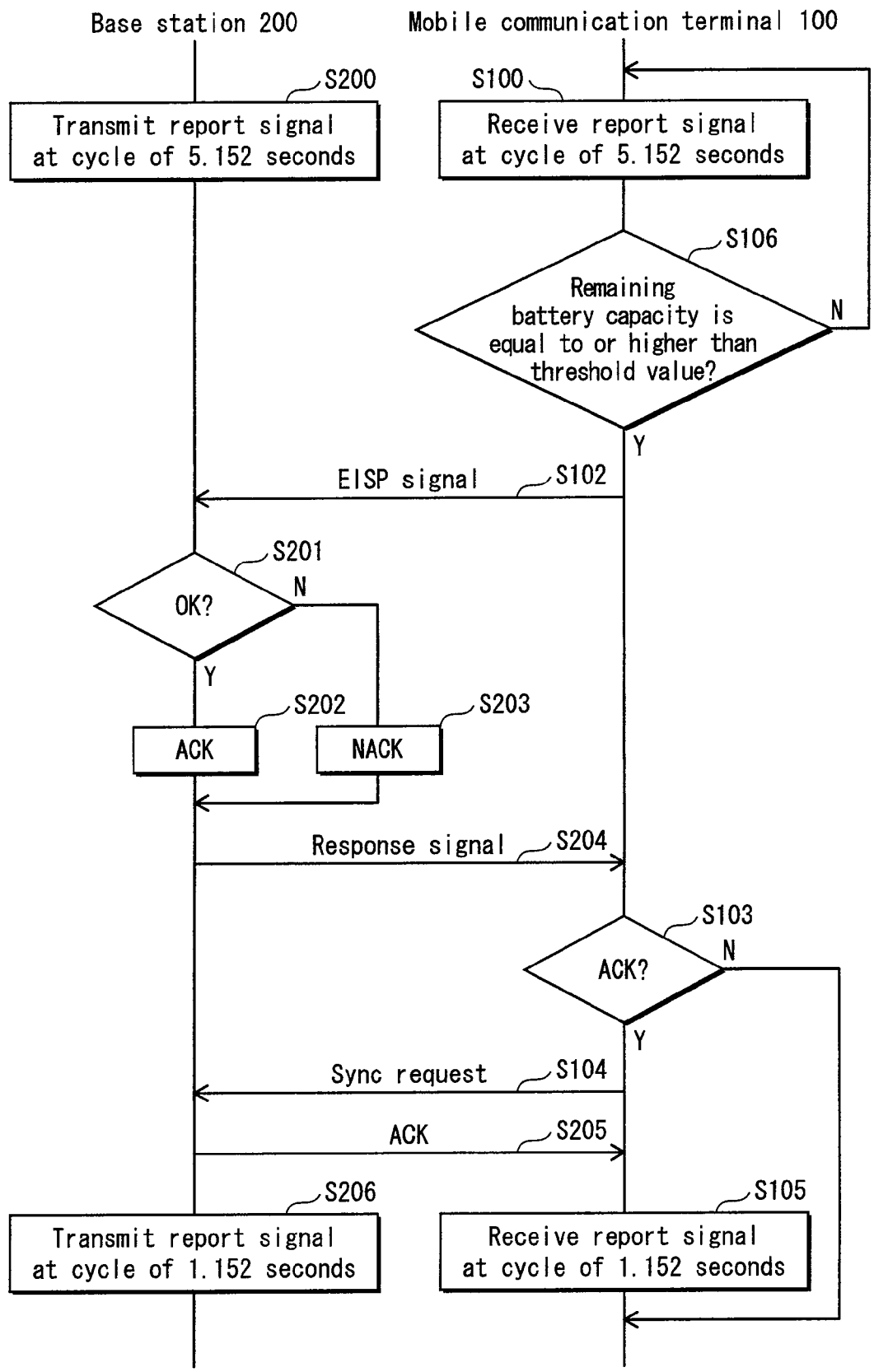
FIG. 7 is a flowchart showing the operation of the mobile communication terminal 100 in Embodiment 2.

As shown in FIG. 7, the mobile communication terminal 100, which is in the standby state, receives the report signal at the cycle of 5.152 seconds (step S100).

The remaining battery capacity judging unit 107b of the control unit 107 judges whether the remaining battery capacity is equal to or higher than the predetermined threshold value or lower than the predetermined threshold value (step S106).

When the remaining battery capacity is equal to or higher than the predetermined threshold value (YES in step S106), the control unit 107 refers to the storage unit 104 and selects a cycle (for example, 1.152 seconds: code F10) that is shorter than 5.152 seconds, generates an EISP signal based on the selection, and transmits the generated EISP signal to the base station 200 via the transmission unit 102 (step S102).

With the above-described operation, when the remaining battery capacity is sufficient, the mobile communication terminal 100 activates the reception unit 103 frequently. With this arrangement, although the amount of battery consumption increases as much, the mobile communication terminal 100 can receive the report signal frequently and the response of the mobile communication terminal 100 to an incoming call is improved.

On the other hand, when the remaining battery capacity is not sufficient, although the response to an incoming call is not satisfactory, the mobile communication terminal 100 can save the battery.

Embodiment 3

1. Overview

In Embodiment 1, the mobile communication terminal 100 transmits the EISP signal by activating the VOIP communication application. In Embodiment 3, the mobile communication terminal 100 transmits the EISP signal depending on the time.

2. Structure

The structure of the mobile communication terminal 100 in Embodiment 3 will be described with reference to FIG. 8.

The constituent elements common to Embodiments 1 and 3 are assigned with the same reference signs and description thereof is omitted here.

Figure 8:
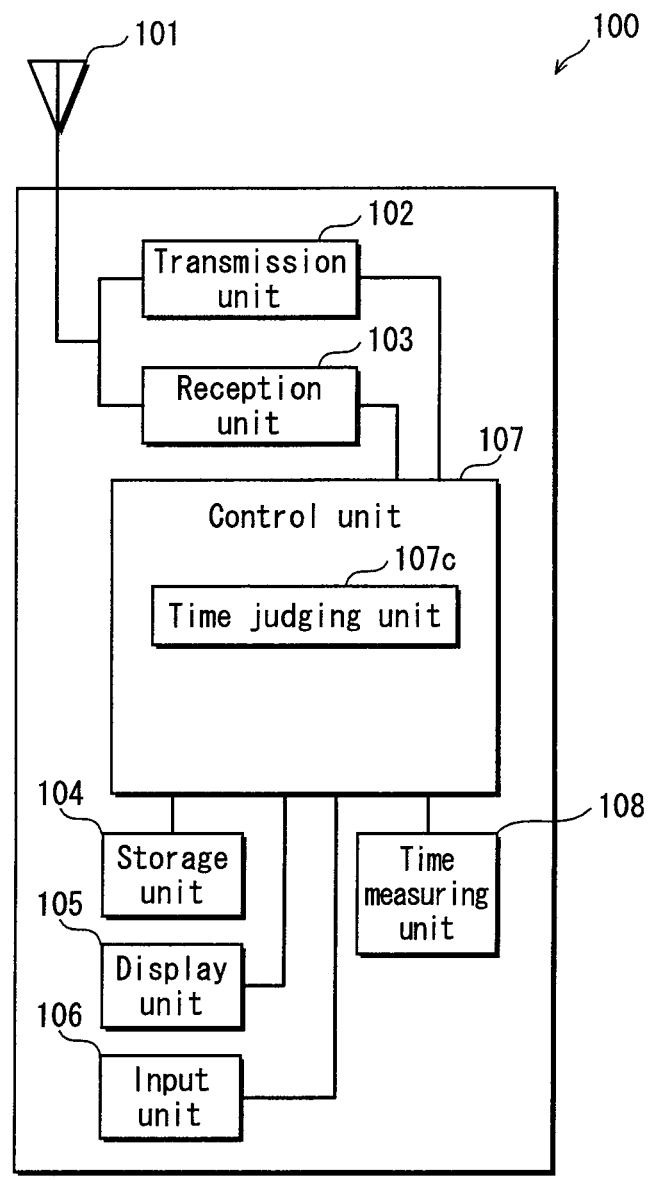
FIG. 8 is a block diagram showing the structure of the mobile communication terminal 100 in Embodiment 3.

With reference to FIG. 8, the mobile communication terminal 100 further includes a time measuring unit 108 for measuring the time.

The control unit 107 includes a time judging unit 107c.

The time judging unit 107c judges whether or not the time measured by the time measuring unit 108 is within a predetermined time period.

The storage unit 104 stores information indicating, for example, a time period of daytime (8:00-17:00) as the predetermined time period.

3. Operation

Next, the operation of the mobile communication terminal 100 in Embodiment 3 will be described with reference to FIG. 9.

The operation steps common to Embodiments 1 and 3 are assigned with the same reference signs and description thereof is omitted here.

Figure 9:
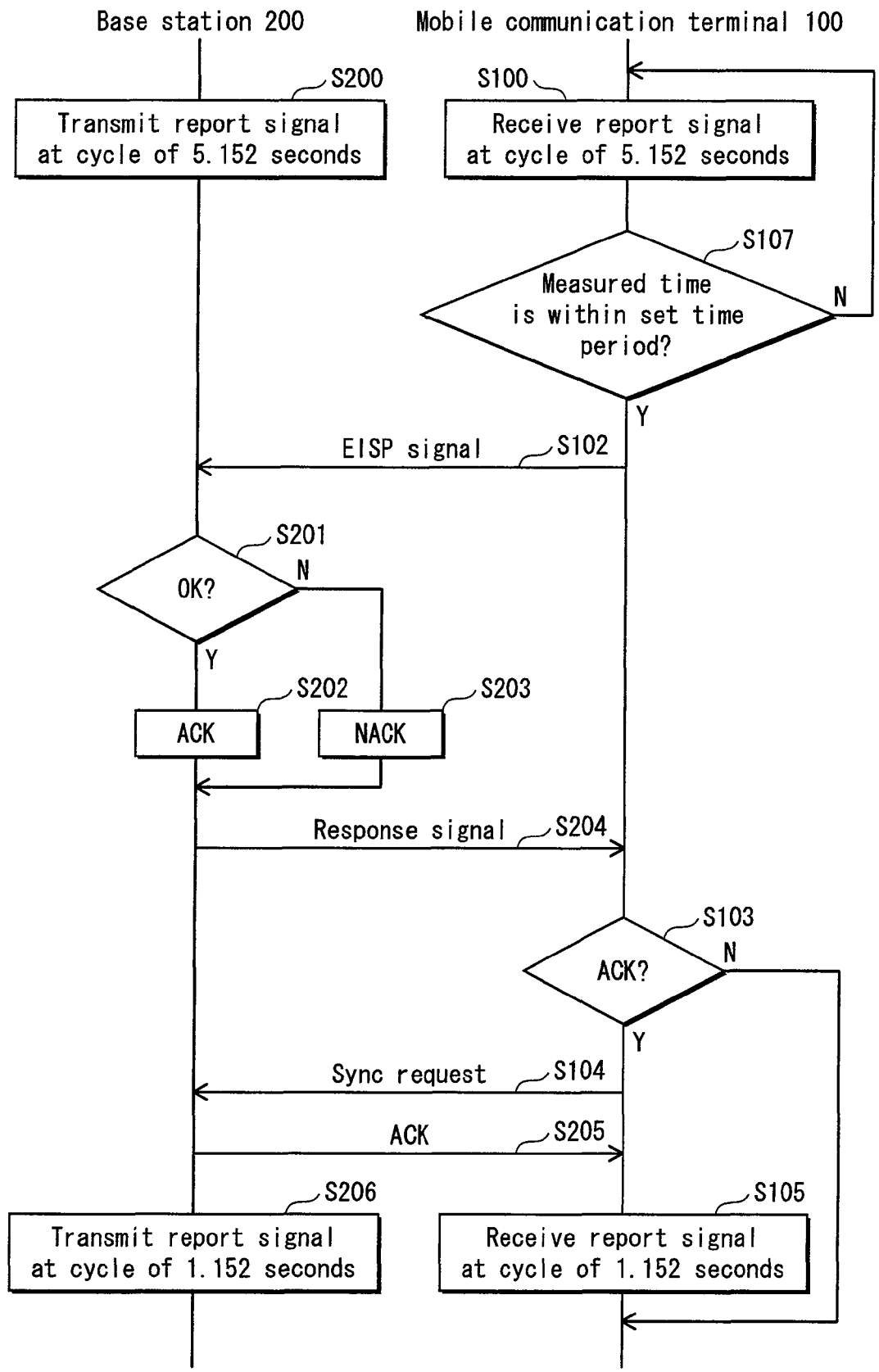
FIG. 9 is a flowchart showing the operation of the mobile communication terminal 100 in Embodiment 3.

As shown in FIG. 9, the mobile communication terminal 100, which is in the standby state, receives the report signal at the cycle of 5.152 seconds (step S100).

The time judging unit 107c of the control unit 107 judges whether or not the time measured by the time measuring unit 108 is within the predetermined time period (daytime) indicated by the information stored in the storage unit 104 (step S107).

When the current time is not within the daytime, namely, is within the nighttime (NO in step S107), the mobile communication terminal 100 continues to receive the report signal at the cycle of 5.152 seconds.

On the other hand, when the current time is within the daytime (YES in step S107), the control unit 107 refers to the storage unit 104 and selects a cycle (for example, 1.152 seconds: code F10) that is shorter than 5.152 seconds, generates an EISP signal based on the selection, and transmits the generated EISP signal to the base station 200 via the transmission unit 102 (step S102).

With the above-described operation, during the daytime when the VOIP communication is expected to be performed actively, the mobile communication terminal 100 activates the reception unit 103 frequently. With this arrangement, although the amount of battery consumption increases as much, the mobile communication terminal 100 can receive the report signal frequently and the response of the mobile communication terminal 100 to an incoming call is improved.

On the other hand, during the nighttime when the VoIP communication is not expected to be performed actively, the mobile communication terminal 100 can save the battery although the response to an incoming call is not satisfactory.

It should be noted here that, in the steps after step S105, the time judging unit 107c may judge whether the current time is within the nighttime, and when the time judging unit 107c judges that the current time is within the nighttime, the control unit 107 may refer to the storage unit 104 and select a cycle of 5.152 seconds (code F6), generate an EISP signal based on the selection, and transmit the generated EISP signal to the base station 200 via the transmission unit 102.

With this operation, the mobile communication terminal 100 can receive the report signal again at the cycle of 5.152 seconds, that is the initial value.

Embodiment 4

1. Overview

In Embodiment 1, the mobile communication terminal 100 transmits the EISP signal by activating the VOIP communication application. In Embodiment 4, the mobile communication terminal 100 transmits the EISP signal depending on the communication quality of communication means which is further provided in the terminal.

2. Structure

The structure of the mobile communication terminal 100 in Embodiment 4 will be described with reference to FIG. 10.

The constituent elements common to Embodiments 1 and 4 are assigned with the same reference signs and description thereof is omitted here.

Figure 10:
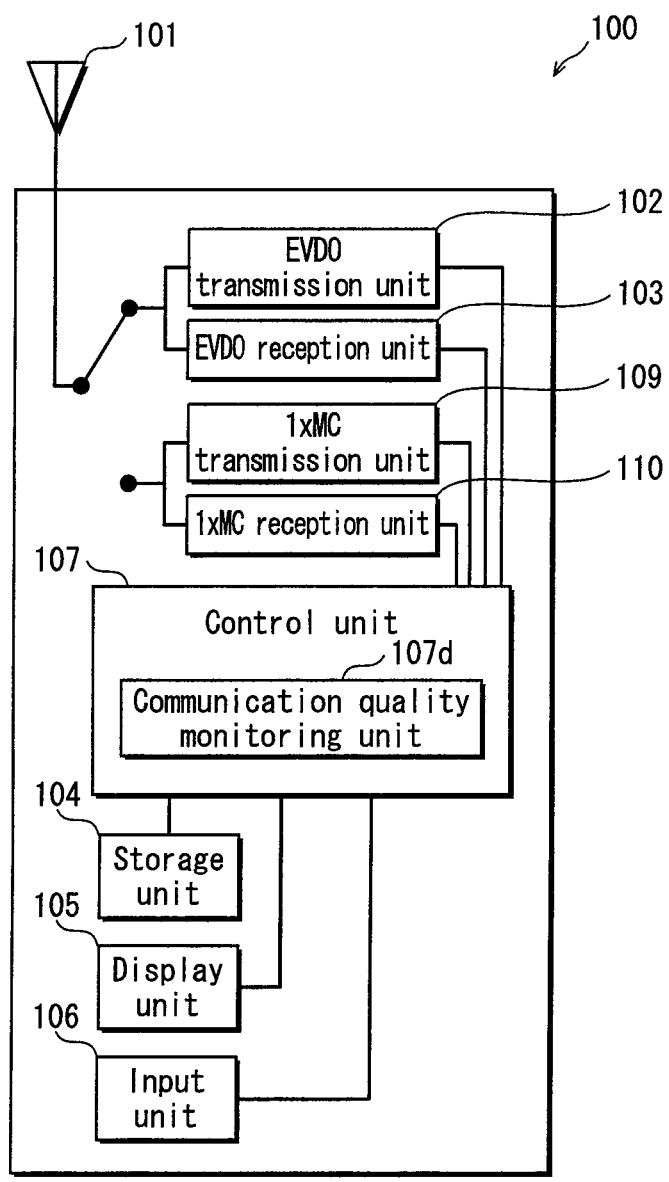
FIG. 10 is a block diagram showing the structure of the mobile communication terminal 100 in Embodiment 4.

With reference to FIG. 10, the mobile communication terminal 100 further includes a transmission unit 109 and a reception unit 110 (hereinafter referred to as "1xMC transmission unit 109" and "1xMC reception unit 110", respectively) that conform to the CDMA2000 1xMC standard, as well as the transmission unit 102 and the reception unit 103 (hereinafter referred to as "EVDO transmission unit 102" and "EVDO reception unit 103", respectively) that conform to the CDMA2000 EVDO standard.

The 1xMC transmission unit 109 sends, to the antenna 101, a signal which has been generated by modulating data to be transmitted in accordance with a protocol defined in the CDMA2000 1xMC standard.

The 1xMC reception unit 110 sends, to the control unit 107, data which has been generated by demodulating a signal received via the antenna 101 in accordance with a protocol defined in the CDMA2000 1xMC standard.

The control unit 107 includes a communication quality monitoring unit 107d.

The communication quality monitoring unit 107d monitors the communication quality (for example, RSSI (Received Signal Strength Indicator)) of the 1xMC reception unit 110, and judges whether the communication quality is lower than a predetermined threshold value.

The storage unit 104 stores the above-mentioned predetermined threshold value.

3. Operation

Next, the operation of the mobile communication terminal 100 in Embodiment 4 will be described with reference to FIG. 11.

The operation steps common to Embodiments 1 and 4 are assigned with the same reference signs and description thereof is omitted here.

Figure 11:
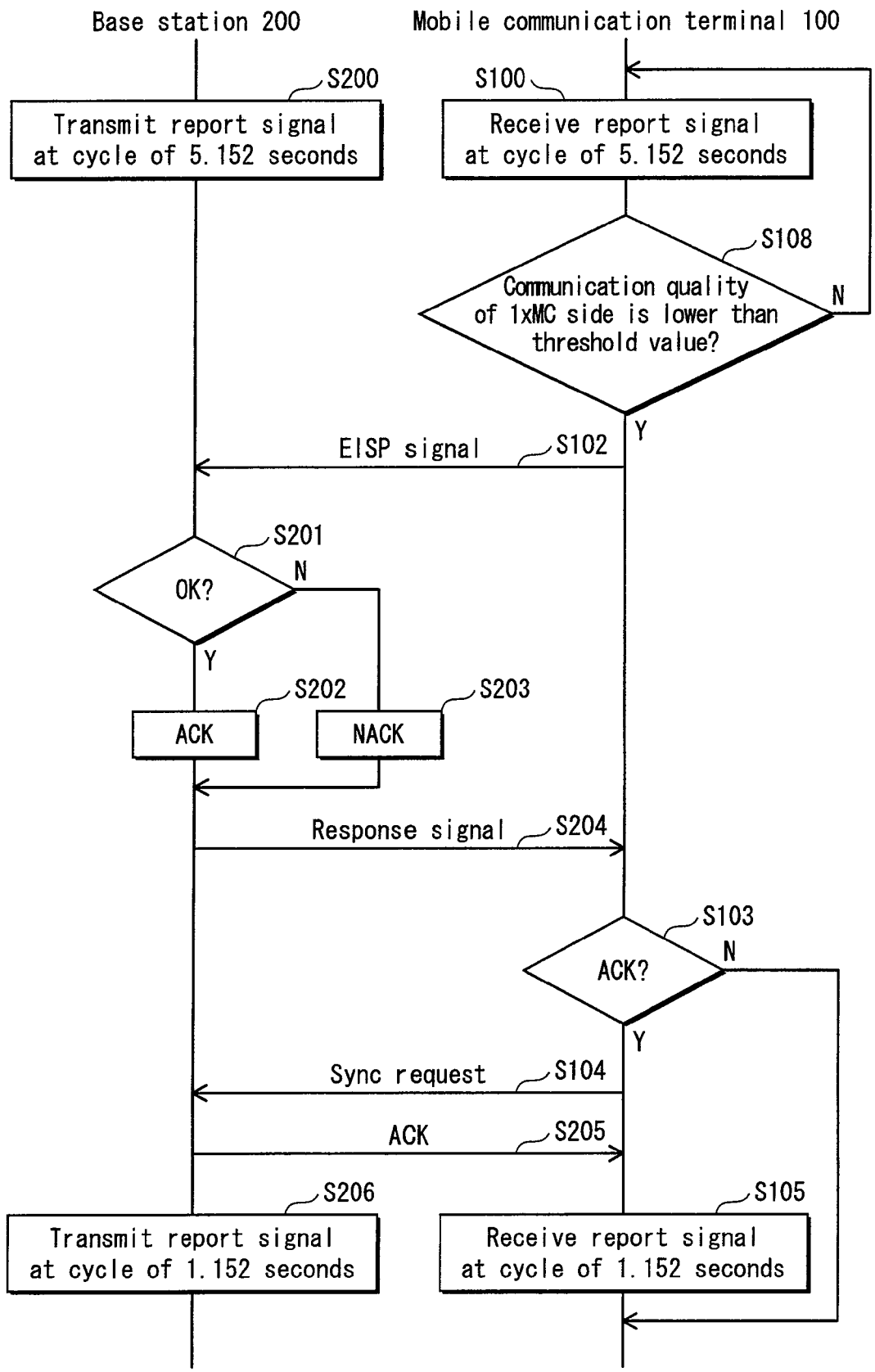
FIG. 11 is a flowchart showing the operation of the mobile communication terminal 100 in Embodiment 4.

As shown in FIG. 11, the mobile communication terminal 100, which is in the standby state, receives the report signal at the cycle of 5.152 seconds (step S100).

The communication quality monitoring unit 107d of the control unit 107 judges whether or not the RSSI value of the 1xMC reception unit 110 is lower than the predetermined threshold value (step S108).

When the communication quality monitoring unit 107d judges that the RSSI value of the 1xMC reception unit 110 is not lower than the predetermined threshold value (NO in step S108), the mobile communication terminal 100 continues to receive the report signal at the cycle of 5.152 seconds.

On the other hand, when the communication quality monitoring unit 107d judges that the RSSI value of the 1xMC reception unit 110 is lower than the predetermined threshold value (YES in step S108), the control unit 107 refers to the storage unit 104 and selects a cycle (for example, 1.152 seconds: code F10) that is shorter than 5.152 seconds, generates an EISP signal based on the selection, and transmits the generated EISP signal to the base station 200 via the EVDO transmission unit 102 (step S102).

With the above-described operation, when the CDMA2000 1xMC side can perform a communication with excellent quality, it is judged that the VOIP communication conforming to the CDMA2000 EVDO standard is not performed actively, and the mobile communication terminal 100 can save the battery although the response to an incoming call is not satisfactory.

On the other hand, when the CDMA2000 1xMC side cannot perform a communication with excellent quality, it is judged that there is a high possibility that the VOIP communication conforming to the CDMA2000 EVDO standard is performed actively, and the mobile communication terminal 100 activates the EVDO reception unit 103 frequently so that the response of the mobile communication terminal 100 to an incoming call can be improved.

It should be noted here that, in the steps after step S105, the communication quality monitoring unit 107d may judge whether the RSSI value of the 1xMC reception unit 110 has been recovered to a value equal to or higher than the predetermined threshold value, and when the communication quality monitoring unit 107d judges that the RSSI value of the 1xMC reception unit 110 has been recovered to a value equal to or higher than the predetermined threshold value, the control unit 107 may refer to the storage unit 104 and select a cycle of 5.152 seconds (code F6), generate an EISP signal based on the selection, and transmit the generated EISP signal to the base station 200 via the EVDO transmission unit 102. With this operation, the mobile communication terminal 100 can receive the report signal again at the cycle of 5.152 seconds, that is the initial value.

Embodiment 5

1. Overview

In Embodiment 1, the mobile communication terminal 100 transmits the EISP signal by activating the VOIP communication application. In Embodiment 5, the mobile communication terminal 100 transmits the EISP signal depending on a key input from the user.

2. Structure

The structure of the mobile communication terminal 100 in Embodiment 5 will be described with reference to FIG. 12.

The constituent elements common to Embodiments 1 and 5 are assigned with the same reference signs and description thereof is omitted here.

Figure 12:
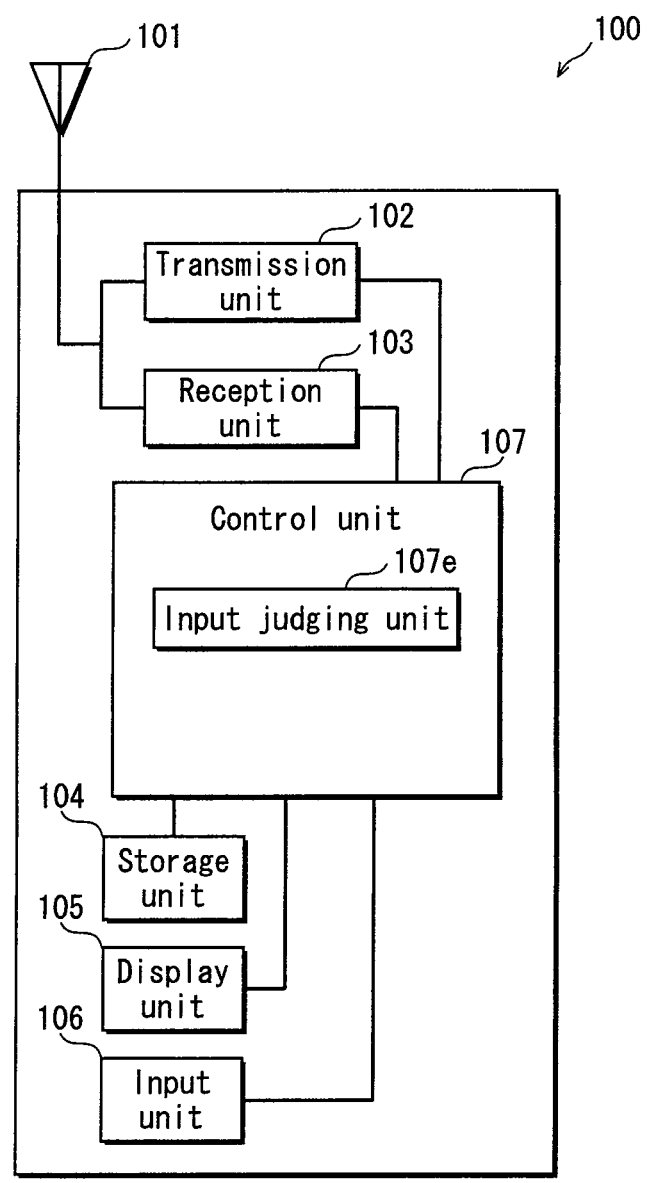
FIG. 12 is a block diagram showing the structure of the mobile communication terminal 100 in Embodiment 5.

With reference to FIG. 12, the control unit 107 includes an input judging unit 107e.

The input judging unit 107e judges whether the user has made an input, on the input unit 106, to shorten the cycle at which the report signal is received.

3. Operation

Next, the operation of the mobile communication terminal 100 in Embodiment 5 will be described with reference to FIG. 13.

The operation steps common to Embodiments 1 and 5 are assigned with the same reference signs and description thereof is omitted here.

Figure 13:
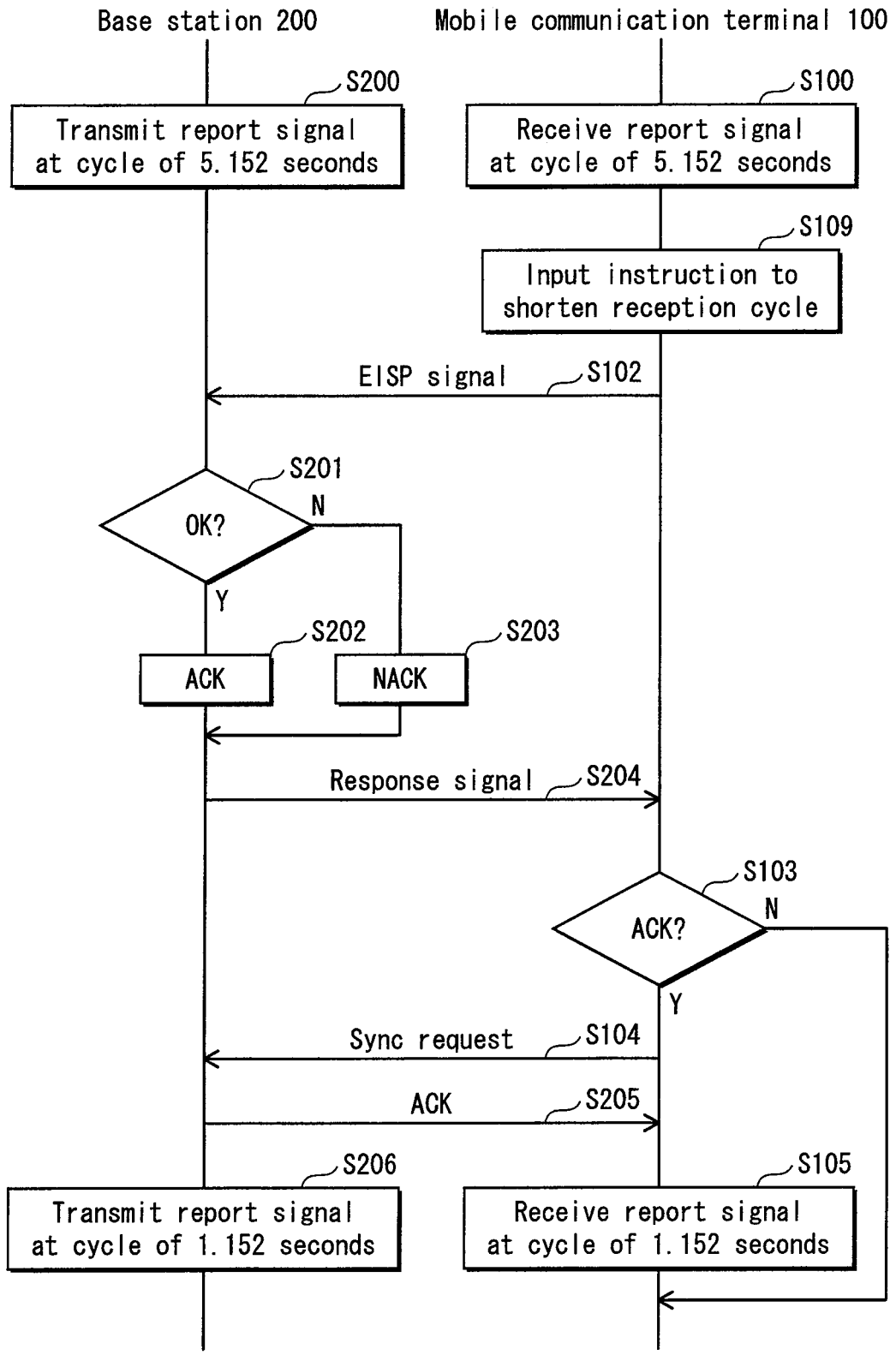
FIG. 13 is a flowchart showing the operation of the mobile communication terminal 100 in Embodiment 5.

As shown in FIG. 13, the mobile communication terminal 100, which is in the standby state, receives the report signal at the cycle of 5.152 seconds (step S100).

The input judging unit 107e of the control unit 107 judges whether or not an instruction to shorten the report signal reception cycle has been input into the input unit 106 (step S109).

When the input judging unit 107e judges that an instruction to shorten the report signal reception cycle has not been input into the input unit 106 (NO in step S109), the mobile communication terminal 100 continues to receive the report signal at the cycle of 5.152 seconds.

On the other hand, when the input judging unit 107e judges that an instruction to shorten the report signal reception cycle has been input into the input unit 106 (YES in step S109), the control unit 107 refers to the storage unit 104 and selects a cycle (for example, 1.152 seconds: code F10) that is shorter than 5.152 seconds, generates an EISP signal based on the selection, and transmits the generated EISP signal to the base station 200 via the transmission unit 102 (step S102).

With the above-described operation, the user, at his/her own will, can cause the mobile communication terminal 100 to activate the reception unit 103 frequently to receive the report signal frequently so that the response of the mobile communication terminal 100 to an incoming call can be improved.

It should be noted here that, in the steps after step S105, the input judging unit 107e may judge whether an input instructing to shorten the report signal reception cycle has been made, and when the input judging unit 107e judges that an input instructing to shorten the report signal reception cycle has been made, the control unit 107 may refer to the storage unit 104 and select a cycle of 5.152 seconds (code F6), generate an EISP signal based on the selection, and transmit the generated EISP signal to the base station 200 via the transmission unit 102. With this operation, the mobile communication terminal 100 can receive the report signal again at the cycle of 5.152 seconds, that is the initial value.

<Supplemental Notes>

Up to now, the mobile communication terminal 100 has been described through Embodiments 1 to 5. However, the structures described in these embodiments can be varied in various ways as shown in the following, for example.

(1) In Embodiments 1 to 5 described above, the mobile communication terminal 100 is initially set such that it receives the report signal at a cycle of approximately 5.152 seconds (code F6). However, not limited to this, the initial value of the cycle may be set to any value that is considered preferable when the operation of the system including the base station 200 is taken into consideration.

(2) In Embodiments 1 to 5 described above, the report signal transmission cycle is shortened to 1.152 seconds (code F10). However, not limited to this, the report signal transmission cycle may be shortened to any value that is shorter than 5.152 seconds.

(3) In Embodiments 1 to 5 described above, it is possible to select a desired cycle from 10.152 seconds (code F1) to 1.152 seconds (code F10). However, these values are provided merely as examples. The values may be determined in accordance with the actual operation.

(4) In Embodiments 1 to 5, processing procedures are described with reference to the flowcharts shown in FIGS. 5, 7, 9 and 11. The processing procedures (steps S100 through S109) may be described in a computer program, and the computer program may be stored in the storage unit 104 such that the program can be executed by the control unit 107.

Also, the above-mentioned computer program may be recorded onto a recording medium that is readable by the mobile communication terminal 100, such as CD-ROM (Compact Disc-Read Only Memory), MO (Magneto Optical disk), DVD (Digital Versatile Disc), DVD-ROM, DVD-RAM, BD (Blu-ray Disc), or a semiconductor memory, and the computer program may be provided via the recording medium.

Furthermore, the above-mentioned computer program may be transmitted to the mobile communication terminal 100 via an electric communication line, a wireless or wired communication line, a network of which the Internet is representative, or the like.

INDUSTRIAL APPLICABILITY

The mobile communication terminal of the present invention is broadly applicable to mobile communication terminals conforming to the CDMA2000 EVDO standard. The technology of the mobile communication terminal of the present invention is useful in that it can save battery of the terminal itself and can detect reception of an incoming call destined thereto in real time when the conditions allow it.

The invention claimed is:

1. A mobile communication terminal conforming to a CDMA2000 EVDO standard and having a function to check reception of an incoming call by receiving a report signal in synchronization with a cycle at which the report signal is transmitted from a base station, the mobile communication terminal comprising:
a judging module operable to judge a state of the terminal;
a transmission module operable to, in accordance with the state judged by the judging module, transmit an Enhanced Idle State Protocol (EISP) signal that requests the base station to change the cycle of transmitting the report signal; and
a reception module operable to receive the report signal at another cycle resulted from the requested change; and
a storage module operable to store a Voice over Internet Protocol (VOIP) communication application operable to perform a communication, wherein
the judging module judges whether the VOIP communication application has been activated, and
when the judging module judges that the VOIP communication application has been activated, the transmission module transmits an Enhanced Idle State Protocol (EISP) signal that requests the base station to shorten the cycle of transmitting the report signal.

2. The mobile communication terminal of claim 1 further comprising:
a measuring module operable to measure a remaining capacity of a battery of the terminal, wherein
the judging module judges whether or not the remaining capacity of the battery measured by the measuring module is lower than a predetermined threshold value, and
when the judging module judges that the remaining capacity of the battery is not lower than the predetermined threshold value, the transmission module transmits an EISP signal that requests to shorten the cycle of transmitting the report signal.

3. The mobile communication terminal of claim 1 further comprising:
a time measuring module operable to measure a time, wherein
the judging module judges whether or not the time measured by the time measuring module is within a predetermined time period, and when the judging module judges that the time measured by the time measuring module is within the predetermined time period, the transmission module transmits an EISP signal that requests to shorten the cycle of transmitting the report signal.

4. The mobile communication terminal of claim 1 further comprising:
   a communication module operable to perform a communication in compliance with a standard that is different from the CDMA2000 EVDO standard; and
   a communication quality monitoring module operable to monitor a communication quality of the communication unit, wherein
   the judging module judges whether or not the communication quality monitored by the communication quality monitoring module is lower than a predetermined threshold value, and
   when the judging module judges that the communication quality monitored by the communication quality monitoring module is lower than the predetermined threshold value, the transmission module transmits an EISP signal that requests to shorten the cycle of transmitting the report signal.

5. The mobile communication terminal of claim 1 further comprising:
   an input module operable to receive an input from a user,
   the judging module judges whether or not the input module has received, from the user, an input that requests to change the cycle, and
   when the judging module judges that the input module has received the input that requests to change the cycle, the transmission module transmits an EISP signal that requests to shorten the cycle of transmitting the report signal.

6. The mobile communication terminal of claim 1 comprising:
   a transmitting module operable to transmit a sync request signal that requests the base station to synchronize, wherein
   the transmitting module transmits the sync request signal when the terminal receives a signal from the base station permitting to change the cycle at which the report signal is transmitted, and
   the transmitting module does not transmit the sync request signal when the terminal receives a signal from the base station not permitting to change the cycle at which the report signal is transmitted, wherein
   the base station transmits a signal indicating whether it permits to change the cycle at which the report signal is transmitted in response to an EISP signal that requests the base station to change the cycle of transmitting the report signal.

7. A communication control method executed by a mobile communication terminal that conforms to a CDMA2000 EVDO standard, has a function to check reception of an incoming call by receiving a report signal in synchronization with a cycle at which the report signal is transmitted from a base station, and includes a storage module operable to store a Voice over Internet Protocol (VOIP) communication application for performing a communication, the communication control method comprising:
   judging a state of the terminal;
   transmitting, in accordance with the state judged by the judging step, an Enhanced Idle State Protocol (EISP) signal that requests the base station to change the cycle of transmitting the report signal; and
   receiving the report signal at another cycle resulted from the requested change, wherein
   the judging step judges whether the VOIP communication application has been activated, and
   when the judging step judges that the VOIP communication application has been activated, the transmitting step transmits an EISP signal that requests the base station to shorten the cycle of transmitting the report signal.

* * * * *